United States Patent Office 3,149,010
Patented Sept. 15, 1964

3,149,010
COMPOSITION COMPRISING A HYDRAZINE AND A HYDRAZINIUM POLYHYDRODECABORATE
Robert K. Armstrong, Glassboro, N.J., assignor to E. I. du Pont de Nemours and Company, Wilmington, Del., a corporation of Delaware
No Drawing. Filed May 7, 1962, Ser. No. 193,651
9 Claims. (Cl. 149—36)

This invention relates to compositions containing boron and nitrogen. More particularly, it relates to compositions containing hydrazines and selected boron compounds, and their preparation.

Compositions containing hydrazine and boron compounds have been employed as fuels for liquid rocket propulsion motors. However, the available compositions are deficient in a number of properties which are desired for satisfactory operation. Compositions are needed, for example, which possess improved stability during handling and storage and which have controllable oxidation rates during use.

It is an object of the present invention to provide boron-containing compositions which have superior stability against premature thermal and oxidative decomposition and which are useful as liquid base fuels.

This object and others are accomplished by providing compositions which are fluid mixtures of a hydrazine and a hydrazinium polyhydrodecaborate(2−).

The term, a hydrazine as used herein, refers to a compound of the general formula $RR'NNH_2$, wherein R and R' are hydrogen or lower alkyl groups, e.g., methyl, ethyl, propyl, butyl, etc. The term, hydrazinium, refers to the cation derived from a hydrazine, i.e., a cation of the formula $(RR'NNH_3)^+$, where R and R' are defined as above.

The term, hydrazinium polyhydrodecaborate(2−), refers to a hydrazine salt of a divalent anion of 10 conjointly bonded boron atoms each of which is singly bonded to hydrogen or other monovalent element or group of elements which form a monovalent substituent. The hydrazinium salts are represented generically by the formula $(RR'NNH_3)_2B_{10}H_{10-n}X_n$, where X is a monovalent substituent consisting of one or more elements, e.g., —OH, —NH$_2$, and the like; and $n$ is a cardinal number of 0–3, i.e., $n$ is 0, 1, 2, or 3.

The polyhydrodecaborate anion, in its simplest form, is represented as $B_{10}H_{10}^{-2}$. However, as noted above, some of the hydrogens on the decaborate cage can be replaced with substituents which are monovalent elements or groups. Preferably such substituents, if present, are groups which impart improved properties to the salt, e.g., groups which increase the solubility of the hydrazinium salts in hydrazines. The polyhydrodecaborate groups, whether substituted or unsubstituted, form divalent anions which combine with 2 moles of a hydrazine to form a dihydrazinium salt.

The preferred compositions of the invention are fluid mixtures or solutions consisting principally of a hydrazine of the formula $RR'NNH_2$ and a hydrazinium decahydrodecaborate(2−) of the formula $(RR'NNH_3)_2B_{10}H_{10}$, where R and R' are hydrogen or lower alkyl groups.

Especially preferred compositions, for reasons of cost and availability of components, are solutions whose principal ccomponents are hydrazine ($NH_2NH_2$) and dihydrazinium decahydrodecaborate(2−)

$$[(NH_2NH_3)_2B_{10}H_{10}]$$

in which the dihydrazinium salt forms up to 50% by weight of the solution and is preferably present in not less than 5% by weight.

The hydrazine and the dihydrazinium polyhydrodecaborate(2−), as defined above, are the characterizing and essential components of the compositions of the invention. These two components together constitute the principal portion of the compositions, i.e., at least 80% by weight of the total composition. Minor amounts of other components can be present, in particular, components which function as freezing-point depressants, e.g., water, hydrogen, sulfide, hydrogen cyanide, and the like. These components, however, do not constitute the novel and characterizing feature of the compositions of the invention.

The compositions are clear solutions which are liquids at normal atmospheric temperatures. They are stable when heated in air for prolonged periods, e.g., the solutions can be heated at 95–100° C. for 4 or more hours in containers open to the air with no signs of decomposition. The solutions can be stored without degradation in conventional containers customarily used for hydrazine. Solutions which contain 50% or more by weight of the hydrazine salt in substantially pure hydrazine may form small deposits on cooling, but these deposits may be dissolved by adding small quantities of water or other solvents or by heating the solution.

The compositions of the invention provide hydrazine solutions which have a high boron content. To illustrate, a solution of about 25% by weight of

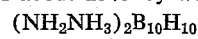
$$(NH_2NH_3)_2B_{10}H_{10}$$

in hydrazine contains 15–16% of boron. In contrast, a solution of about 25% by weight of a hydrazinium salt of a lower hydroborate, e.g., $NH_2NH_3BH_4$, contains only about 6% by weight of boron. A further advantage of the compositions of the invention lies in the high rates of combustion of hydrazinium salts of polyhydrodecaborate anions, especially the $B_{10}H_{10}^{-2}$ anion. This property permits the release of large quantities of energy under readily controlled conditions. Compositions derived from salts of unsubstituted hydrazines, i.e., solutions of $(NH_2NH_3)_2B_{10}H_{10}$, have the additional advantage of being free of carbon and their value as high energy fuels is therefore enhanced.

Examples of compositions which are within the scope of the invention are as follows, in which units are given as percent by weight of the total solution:

5% $(NH_2NH_3)_2B_{10}H_{10}$-95% $NH_2NH_2$,
10% $(NH_2NH_3)_2B_{10}H_{10}$- 90% $NH_2NH_2$,
25% $(NH_2NH_3)_2B_{10}H_{10}$-75% $NH_2NH_2$,
12% $[(CH_3)_2NNH_3]_2B_{10}H_{10}$-88% $(CH_3)_2NNH_2$,
20% $[(CH_3)_2NNH_3]_2B_{10}H_{10}$-80% $NH_2NH_2$,
15% $(C_2H_5NHNH_3)_2B_{10}H_{10}$-85% $C_2H_5NHNH_2$,
17% $(NH_2NH_3)_2B_{10}H_9OH$-83% $NH_2NH_2$,
20% $(NH_2NH_3)_2B_{10}H_8(OH)_2$-80% $NH_2NH_2$,
25% $(NH_2NH_3)_2B_{10}H_8(NH_2)_2$-75% $NH_2NH_2$,
20% $(NH_2NH_3)_2B_{10}H_{10}$-75% $NH_2NH_2$-5% $H_2O$,
25% $(NH_2NH_3)_2B_{10}H_{10}$-65% $NH_2NH_2$-10% HCN,
20% $(NH_2NH_3)_2B_{10}H_{10}$-75% $NH_2NH_2$-5% $H_2S$,
30% $(NH_2NH_3)_2B_{10}H_{10}$-68% $NH_2NH_2$-2% $H_2O$, and
50% $(NH_2NH_3)_2B_{10}H_{10}$-45% $NH_2NH_2$-5% HCN.

Compositions of the invention containing a hydrazinium decahydrodecaborate(2−) are prepared simply and directly by mixing a bis(dilower alkyl sulfide)decaborane(12) with a hydrazine and warming the mixture until the lower alkyl sulfide is volatilized. The final composition of the solution can be adjusted, as desired, by adding more of a hydrazine or by warming to volatilize part of excess hydrazine. Modifications can be made in the process, some of which are described later.

Hydrazines which are employed as one reactant in the process are well known compounds of the formula $RR'NNH_2$, as described earlier. Operable hydrazines include

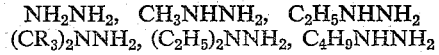
$NH_2NH_2$, $CH_3NHNH_2$, $C_2H_5NHNH_2$
$(CR_3)_2NNH_2$, $(C_2H_5)_2NNH_2$, $C_4H_9NHNH_2$ and the like. The hydrazines need not be anhydrous and usually they can be employed as purchased in 90% or higher purity. The preferred hydrazine is $NH_2NH_2$.

The hydrazine employed to prepare the salt is not necessarily the same hydrazine employed in preparing the final solution. To illustrate, $[(CH_3)_2NNH_3]_2B_{10}H_{10}$ can be dissolved in $NH_2NH_2$ to obtain a composition of the invention.

The bis(diloweralkylsulfide)decaboranes, employed as the second reactant in the process, are not generally available products. They are easily prepared by mixing decaborane(14), i.e., $B_{10}H_{14}$, with an excess of a loweralkyl sulfide at 20–50° C. until approximately one mole of hydrogen is released per mole of decaborane(14). The reaction mixture is evaporated to obtain

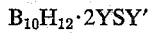

$$B_{10}H_{12} \cdot 2YSY'$$

where Y and Y′ are loweralkyl groups. The preparation of a typical reactant, $B_{10}H_{12} \cdot 2S(CH_3)_2$ is described fully in Example A.

Solutions of a hydrazine and a dihydrazinium decahydrodecaborate are obtained directly by employing the hydrazine in excess. The quantity of hydrazine which is used will be based on the concentration of hydrazinium salt which is desired in the final solution. The quantity can be determined by conventional chemical calculations based on the stoichiometry of the process. In the process, 2 moles of lower alkyl sulfide are volatilized for each mole of $B_{10}H_{12} \cdot 2YSY'$ used. Preferably, at least two moles of the hydrazine are used for each mole of

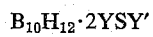

$$B_{10}H_{12} \cdot 2YSY'$$

In the event more accurate control of the composition of the final solution is desired, the reaction mixture is warmed until all volatile products (hydrazine, dialkyl sulfide, and impurities) are removed and the dihydrazinium salt remains as a white solid. The salt is crystallized from water and dried in vacuo. The dihydrazinium salt so obtained usually contains hydrazine of crystallization. The salt is then dissolved in a hydrazine, employing quantities sufficient to provide a solution of the desired concentration.

In the above process it is preferable to employ at least two moles of the hydrazine to one mole of the bis(diloweralkylsulfide)decaborane(12). A higher ratio of hydrazine to the decaborane reactant can be employed to obtain a solution of the salt in the hydrazine directly.

The reaction proceeds rapidly and it is speeded by warming. A continuous process can be employed whereby the reaction mixture flows in thin layers over warm plates or a batch process can be used whereby the reactants are simply mixed and warmed for a period of time sufficient to expel the sulfide. The time of the reaction will, therefore, be determined to a large extent by the process which is employed. The time may be as short as one minute or less, or it may be up to 30 minutes or longer.

The temperature of the reaction is not critical and it will be dependent to some extent on the boiling point or vapor pressure of the dialkyl sulfide. The temperature can be as low as 0° C., or it may be as high as 150° C. or higher. Generally, a temperature of 10° to 100° C. is employed.

An optional method of preparing the compositions of the invention employs the following sequence of operations: (1) reaction of $B_{10}H_{12} \cdot 2YSY'$ with ammonia (or an amine) to obtain an ammonium salt of the formula $(R_3NH)_2B_{10}H_{10}$, where the R groups are hydrogen or lower alkyl, and (2) mixing the salt $(R_3NH)_2B_{10}H_{10}$ with hydrazine and warming to expel ammonia or the amine of the formula $R_3N$, e.g., $NH_3$, $CH_3NH_2$, and the like.

A further optional method consists in dissolving in a hydrazine a polyhydrodecaboric acid of the formula $H_2B_{10}H_{10-n}X_n$, where X and $n$ have the meanings given in a previous paragraph. To obtain the free acid, an aqueous solution of a salt of a polyhydrodecaborate anion, e.g., $(NH_4)_2B_{10}H_{10}$, is passed through a column filled with an acidic ion-exchange resin (e.g., a commercial cross-linked polystyrenesulfonic acid) and the aqueous effluent can be evaporated to dryness to obtain the acid which in this instance is $H_2B_{10}H_{10}$, in the form of crystals which contain water of crystallization. Alternatively, the aqueous effluent can be titrated with a hydrazine until the solution is neutral. This solution is then evaporated to obtain the hydrazinium salt in pure form which is then dissolved in a hydrazine in the amount required to provide a solution of the desired concentration.

Polyhydrodecaborate salts which bear substituents designated as X bonded to boron, are obtained by reacting a decahydrodecaborate [the acid or a salt, e.g., $H_2B_{10}H_{10}$, $(NH_4)_2B_{10}H_{10}$, and the like] with an appropriate reagent which leads to replacement of hydrogen bonded to boron by an X group. The product thus obtained is processed by the methods described earlier to obtain the hydrazinium salt. Processes for the preparation of representative substituted polyhydrodecaborates are described in the following paragraphs.

Substituted polyhydrodecaborates in which the substituent X is OH are obtained by treating a mixture of a decahydrodecaborate salt an amide with a gaseous hydrogen halide, isolating the adduct so obtained and hydrolyzing the adduct with a strong base. To illustrate, gaseous HCl is bubbled through a mixture of 20 g. of $(NH_4)_2B_{10}H_{10}$ and 100 ml. of $HC(O)N(CH_3)_2$. The temperature of the mixture rises initially and flow of gas is continued until the temperature drops. The mixture is filtered and the filtrate is treated with a solution consisting of 400 ml. of ethanol, 10 ml. of methanol, and 45 g. of CsOH. A cesium salt precipitates and is separated by filtration. The cesium salt is dissolved in a minimum quantity of water and slightly more than one equivalent of NaOH in aqueous solution is added with stirring. The mixture is warmed at 90–95° C. 2 hours, an excess of aqueous CsOH solution is added and the solution is poured into three times its volume of ethanol. The compound $Cs_2B_{10}H_9OH$ precipitates. It is separated, redissolved in water, and the aqueous solution is passed through an acid ion-exchange column. The aqueous effluent is neutralized with $RR'NNH_2$, e.g., $NH_2NH_2$, and the neutral solution is evaporated to obtain the hydrazinium salt

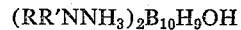

$$(RR'NNH_3)_2B_{10}H_9OH$$

This salt is then dissolved in the desired amount in a hydrazine to obtain a solution within the scope of the compositions of the invention.

Compositions in which the decaborate salt bears two OH groups are obtained, for example, by heating to boiling a mixture of 20 g. of $(NH_4)_2B_{10}H_{10}$, 22 ml. of concentrated hydrochloric acid and 150 ml. of N-methyl-2-pyrrolidone until 20 ml. of water is removed. The reaction mixture is cooled, filtered and the filtrate is poured into 800 ml. of water. The solid which forms is separated and it is suspended in an aqueous solution of NaOH. The suspension is boiled until the compound dissolves and the solution is filtered. An aqueous solution of CsOH is added to the cooled filtrate and the yellow precipitate, which is $Cs_2B_{10}H_8(OH)_2$, is separated. The compound is processed as described earlier for the monohydroxy-substituted product to obtain a hydrazinium salt of the formula $(RR'NNH_3)_2B_{10}H_8(OH)_2$ which is dissolved in the desired hydrazine to obtain a composition of the invention, e.g., $(NH_2NH_3)_2B_{10}H_8(OH)_2$ in $NH_2NH_2$.

Substituted polyhydrodecaborates in which the substituent is $—NH_2$ are obtained by reacting $(NH_4)_2B_{10}H_{10}$ with nitrous acid, reducing the product so obtained in solution, isolating the resulting product and reacting it with liquid ammonia to obtain $H_2B_{10}H_8(NH_2)_2$ or, expressed in isomeric form, $B_{10}H_8 \cdot 2NH_3$. For example, a solution of 18 g. of $NaNO_2$ in 65 ml. water is chilled to 15° C. and it is added to a solution (also at 15° C.) of 20 g. $(NH_4)_2B_{10}H_{10}$ in 200 ml. water. To this solution 65 ml. of 12% of hydrochloric acid (also at 15° C.) is added with stirring. The mixture is filtered and zinc and hydrochloric acid are added to the filtrate. The mixture is stirred for a few minutes and filtered again. The solid cake is extracted repeatedly with ethanol and the combined ethanol extracts are diluted with water. The precipitate which forms is separated by filtration. The solid precipitate is mixed with liquid $NH_3$ and the mixture is heated at 200° C. for 15 minutes at 1000 lbs./sq. in. pressure. A white crystalline solid is obtained which is $B_{10}H_8 \cdot 2NH_3$ or, written as its isomer, $H_2B_{10}H_8(NH_2)_2$. This product is dissolved in a hydrazine to obtain a solution of $(RR'NNH_3)_2B_{10}H_8(NH_2)_2$, i.e., a composition which is within the scope of this invention.

The compositions of the invention and their preparation are illustrated further by the examples which follow.

EXAMPLE A

A. *Preparation of a Bis(Diloweralkylsulfide)Decaborane(12)*

A reaction vessel having a capacity of about 365 parts of water is charged with 0.79 part of decaborane(14), cooled in liquid nitrogen, and then evacuated to a pressure of 10 microns of mercury. Approximately 21 parts of methyl sulfide is condensed onto the decaborane(14) in the reaction vessel. The reaction vessel is closed, allowed to warm to room temperature (about 25° C.) and stand for 4 days. During this period, 6.6 millimoles of hydrogen is evolved. The reaction vessel is opened and excess methyl sulfide is removed by distillation, leaving a practically quantitative yield of a white solid residue of $B_{10}H_{12} \cdot 2S(CH_3)_2$. The compound is recrystallized from ethyl acetate and it melts at 122–124° C.

B. *Preparation of $(NH_4)_2B_{10}H_{10}$*

Bis(dimethylsulfide)decaborane(12) (8.5 parts) is mixed with 40–45 parts of liquid ammonia and stirred in a round-bottom reaction vessel for one hour with the vessel being cooled to about −50° C. by partial immersion in a mixture of solid carbon dioxide and acetone. The cooling bath is then removed and the excess ammonia is allowed to evaporate with stirring. The remaining traces of ammonia are removed by subjecting the residue to a high vacuum (0.01 mm. of mercury) at 25° C. There is obtained 5.6 parts of solid residue which is virtually a quantitative yield of diammonium decahydrodecaborate(2−), i.e., $(NH_4)_2B_{10}H_{10}$.

EXAMPLE I (A) Twenty-five parts of $(NH_4)_2B_{10}H_{10}$ is dissolved in water and the aqueous solution is passed through a column filled with a commercial acid ion-exchange resin resin of the polystyrenesulfonic acid class. The aqueous effluent is collected and hydrazine hydrate is added to it with stirring in sufficient quantity to make the solution basic. The solution is evaporated under reduced pressure until a semi-solid mass forms. The semi-solid residue is crystallized from water to obtain pure-white crystals of dihydrazinium decahydrodecaborate(2−) containing one mole of hydrazine as solvent of crystallization.

*Analysis.*—Calc'd for $(NH_2NH_3)_2B_{10}H_{10} \cdot NH_2NH_2$: N, 38.8. Found: N, 37.2.

(B) The hydrazinium salt obtained in Part A is mixed with hydrazine $(NH_2NH_2)$ in the ratio of approximately 0.8 part of the hydrazinium salt to 1.0 part of hydrazine. A solution forms which contains about 38 parts by weight of $(NH_2NH_3)_2B_{10}H_{10}$ for each 100 parts of solution. The solution is stable at prevailing atmospheric temperature (ca. 20–25° C). It is heated at steam temperature (95–100° C.) for one hour with no evidence of decomposition or reaction.

(C) Equal parts by weight of the salt of Part A and hydrazine are mixed. A solution forms which contains about 42.5 parts by weight of $(NH_2NH_3)_2B_{10}H_{10}$ per 100 parts of solution. The solution is stable at prevailing atmospheric temperature and does not decompose on storage.

EXAMPLE II

Approximately equal weights of $(NH_4)_2B_{10}H_{10}$ and hydrazine (95+% purity) are mixed with stirring. Ammonia is evolved and a solution of approximately 50% by weight of $(NH_2NH_3)_2B_{10}H_{10}$ in hydrazine is obtained.

EXAMPLE III

A mixture of about 1.0 part of $(NH_4)_2B_{10}H_{10}$ and 2 parts of 1,1-dimethylhydrazine is stirred and heated for 10 minutes at steam bath temperature (95–100° C.). Ammonia is released in the process and a clear solution of bis(1,1-dimethylhydrazinium) decahydrodecaborate-(2−) in 1,1-dimethylhydrazine is obtained.

The solution is evaporated to obtain $$[(CH_3)_2N_2H_3]_2B_{10}H_{10}$$

as a white crystalline hygroscopic solid.

EXAMPLE IV (A) A mixture of approximately 0.5 part of $$B_{10}H_{12} \cdot 2S(CH_3)_2$$

and 5 parts of hydrazine hydrate is stirred at atmospheric temperature (ca. 25° C.) for 4 hours. A clear solution containing approximately 5% by weight of $$(NH_2NH_3)_2B_{10}H_{10}$$

in hydrazine is obtained. Dimethyl sulfide is formed as a by-product which is lost by volatilization.

(B) A solution of $B_{10}H_{12} \cdot 2S(CH_3)_2$ in hydrazine is prepared in the manner described in Part A. The solution is evaporated to obtain dihydrazinium decahydrodecaborate containing one mole of hydrazine as solvent of crystallization. The identity of the compound, which has the formula $(NH_2NH_3)_2B_{10}H_{10} \cdot NH_2NH_2$ is confirmed by its infrared absorption spectrum.

The solubility of dihydrazinium decahydrodecaborate(2−) in hydrazine over a temperature range of 0° to 50° C. is shown in Table I wherein the solubility is expressed as parts of $H_2B_{10}H_{10}$ in 100 parts of solution (% by weight).

TABLE I

| Temperature—0° C.: | Solubility (Percent by wt. of $H_2B_{10}H_{10}$) |
|---|---|
| 0 | 23.7 |
| 11 | 25.1 |
| 24.8 | 28.6 |
| 50 | 34.1 |

In Example V, which follows, $[(C_2H_5)_3NH]_2B_{10}H_{10}$ is employed as a reactant. This compound is obtained by the process of Example A, Part B, employing $(C_2H_5)_3N$ in place of liquid ammonia. More specifically, an excess of $(C_2H_5)_3N$ is reacted with $B_{10}H_{12} \cdot 2S(CH_3)_2$ to obtain $[(C_2H_5)_3NH]_2B_{10}H_{10}$ as a white crystalline product.

EXAMPLE V

A solution consisting of 100 ml. of water and 6.4 g. of $[(C_2H_5)_3NH]_2B_{10}H_{10}$ is mixed with 1.3 g. of $NH_2NH_2$ (95%+). The mixture is warmed at steam bath temperatures (90–100° C) and evaporated to dryness. The solid residue is recrystallized from 95% ethanol to obtain $(NH_2NH_3)_2B_{10}H_{10}$, a white crystalline product which melts at 108–116° C. The product dissolves readily in hydrazine.

The composition of the products of the invention can be expressed in terms of percent by weight or of mole ratios of components. By way of illustration, a preferred composition consists of hydrazine and dihydrazinium decahydrodecaborate in which the ratio, moles hydrazine/moles $(NH_2NH_3)_2B_{10}H_{10}$, is 2.5.

The compositions of the invention are useful as liquid fuels or monopropellants in liquid rocket propulsion motors. They can be used, if desired, in conjunction with minor quantities of oxidizing agents, e.g., nitrogen tetroxide, fluorine oxide, and the like to provide fuels of high specific impulse and heat of combustion.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A fluid composition comprising a hydrazine of the general formula $RR'NNH_2$ wherein R and R' are groups selected from the class consisting of hydrogen and lower alkyl, and a hydrazinium polyhydrodecaborate of the general formula $(RR'NNH_3)_2B_{10}H_{10-n}X_n$ wherein R and R' are defined as above, X is a substituent selected from the class consisting of hydroxyl and amino, and $n$ is a cardinal number of 0 through 3.

2. A fluid composition comprising a hydrazine of the general formula $RR'NNH_2$ wherein R and R' are groups selected from the class consisting of hydrogen and lower alkyl, and a hydrazinium polyhydrodecaborate of the general formula $(NH_2NH_3)_2B_{10}H_{10-n}X_n$ wherein X is a substituent selected from the class consisting of hydroxyl and amino, and $n$ is a cardinal number of 0 through 3.

3. A fluid composition comprising a hydrazine of the formula $NH_2NH_2$ and a hydrazinium polyhydrodecaborate of the general formula $(RR'NNH_3)_2B_{10}H_{10-n}X_n$ wherein R and R' are groups selected from the class consisting of hydrogen and lower alkyl, X is a substituent selected from the class consisting of hydroxyl and amino, and $n$ is a cardinal number of 0 through 3.

4. A fluid composition comprising a hydrazine of the formula $NH_2NH_2$ and a hydrazinium polyhydrodecaborate of the general formula $(NH_2NH_3)_2B_{10}H_{10-n}X_n$ wherein X is a substituent selected from the class consisting of hydroxyl and amino, and $n$ is a cardinal number of 0 through 3.

5. A fluid composition comprising a hydrazine of the formula $RR'NNH_2$ wherein R and R' are groups selected from the class consisting of hydrogen and lower alkyl, and a hydrazinium polyhydrodecarborate of the general formula $(RR'NNH_3)_2B_{10}H_{10}$ wherein R and R' are defined as above.

6. A fluid composition comprising a hydrazine of the formula $RR'NNH_2$ wherein R and R' are groups selected from the class consisting of hydrogen and lower alkyl, and a hydrazinium polyhydrodecaborate of the general $(NH_2NH_3)_2B_{10}H_{10}$.

7. A fluid composition comprising a hydrazine of the formula $NH_2NH_2$ and a hydrazinium polyhydrodecaborate of the formula $(RR'NNH_3)_2B_{10}H_{10}$ wherein R and R' are selected from the class consisting of hydrogen and lower alkyl.

8. A fluid composition comprising a hydrazine of the formula $NH_2NH_2$ and a hydrazinium polyhydrodecaborate of the formula $(NH_2NH_3)_2B_{10}H_{10}$.

9. A fluid composition comprising a hydrazine of the formula $NH_2NH_2$ and a hydrazinium polyhydrodecaborate of the formula $[(CH_3)_2NNH_3]_2B_{10}H_{10}$.

No references cited.